(12) United States Patent
Siyavudeen et al.

(10) Patent No.: US 11,178,006 B2
(45) Date of Patent: Nov. 16, 2021

(54) REPLACEMENT OF COLLABORATION ENDPOINTS

(71) Applicant: Cisco Technology, Inc., San Jose, CA (US)

(72) Inventors: Faisal Siyavudeen, Kerala (IN); Wayne Moorefield, Jr., Raleigh, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 72 days.

(21) Appl. No.: 16/812,673

(22) Filed: Mar. 9, 2020

(65) Prior Publication Data

US 2021/0281474 A1 Sep. 9, 2021

(51) Int. Cl.
*H04L 12/24* (2006.01)
*H04L 29/06* (2006.01)

(52) U.S. Cl.
CPC ........ *H04L 41/0806* (2013.01); *H04L 63/083* (2013.01); *H04L 63/0876* (2013.01); *H04L 65/1059* (2013.01)

(58) Field of Classification Search
None
See application file for complete search history.

(56) References Cited

U.S. PATENT DOCUMENTS

| | | | | |
|---|---|---|---|---|
| 8,583,107 | B2 * | 11/2013 | Chintada | H04L 65/1069 455/432.1 |
| 2005/0198218 | A1 * | 9/2005 | Tasker | H04M 3/42229 709/220 |
| 2007/0220280 | A1 * | 9/2007 | Karam | H04L 12/10 713/300 |
| 2012/0127986 | A1 * | 5/2012 | Verbil | H04L 65/1006 370/352 |
| 2013/0010782 | A1 * | 1/2013 | Jensen | H04L 61/103 370/352 |
| 2015/0078373 | A1 * | 3/2015 | Roberts | H04L 41/0806 370/352 |
| 2018/0082318 | A1 * | 3/2018 | Koppy | G06Q 30/0222 |
| 2018/0167271 | A1 * | 6/2018 | Bower, III | H04L 41/0886 |
| 2018/0343551 | A1 * | 11/2018 | Rao | G06F 9/44505 |
| 2019/0107987 | A1 * | 4/2019 | Tangeland | H04L 41/0886 |

* cited by examiner

*Primary Examiner* — June Y Sison
(74) *Attorney, Agent, or Firm* — Merchant & Gould P.C.

(57) ABSTRACT

Replacement of collaboration endpoints may be provided. First, a management server may cause a deprecated device to display an upgrade function notification. An indication from the deprecated device that the upgrade function notification has been selected may be received. In response to receiving the indication from the deprecated device that the upgrade function notification has been selected, the deprecated device may be caused to display a password and instructions to replace the deprecated device with a new device. Next, the password and an address associated with the new device may be received from the new device. In response to receiving the password, the new device may then be provisioned using the address.

15 Claims, 5 Drawing Sheets

REPLACEMENT OF COLLABORATION ENDPOINTS

TECHNICAL FIELD

The present disclosure relates generally to endpoint replacement.

BACKGROUND

Voice over Internet Protocol (VoIP) systems manage the delivery of voice information over the Internet. VoIP involves sending voice information in digital form in discrete packets rather than using the traditional circuit-committed protocols of the Public Switched Telephone Network (PSTN). VoIP is also referred to as IP Telephony, Internet telephony, Broadband telephony, Broadband Phone, and Voice over Broadband. An advantage of using VoIP is that it avoids the tolls charged by ordinary telephone service providers. As such, VoIP systems are becoming ever more common within enterprises.

A call agent handles VoIP call routing for VoIP clients. The call agent makes a VoIP call using a destination telephone number or uniform resource identifier (URI). This number may be associated with a client on the same call agent, in which case the call is sent directly to that client. Or, the number might be associated with a client associated with a different agent within the same enterprise. In that case, the call agent sends the call, to that agent, using configured rules that define how to route the call. When users within the enterprise communicate with users outside of the enterprise, the call is terminated on a PSTN gateway and routed off to the PSTN. This, however, eliminates many of the benefits of VoIP.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
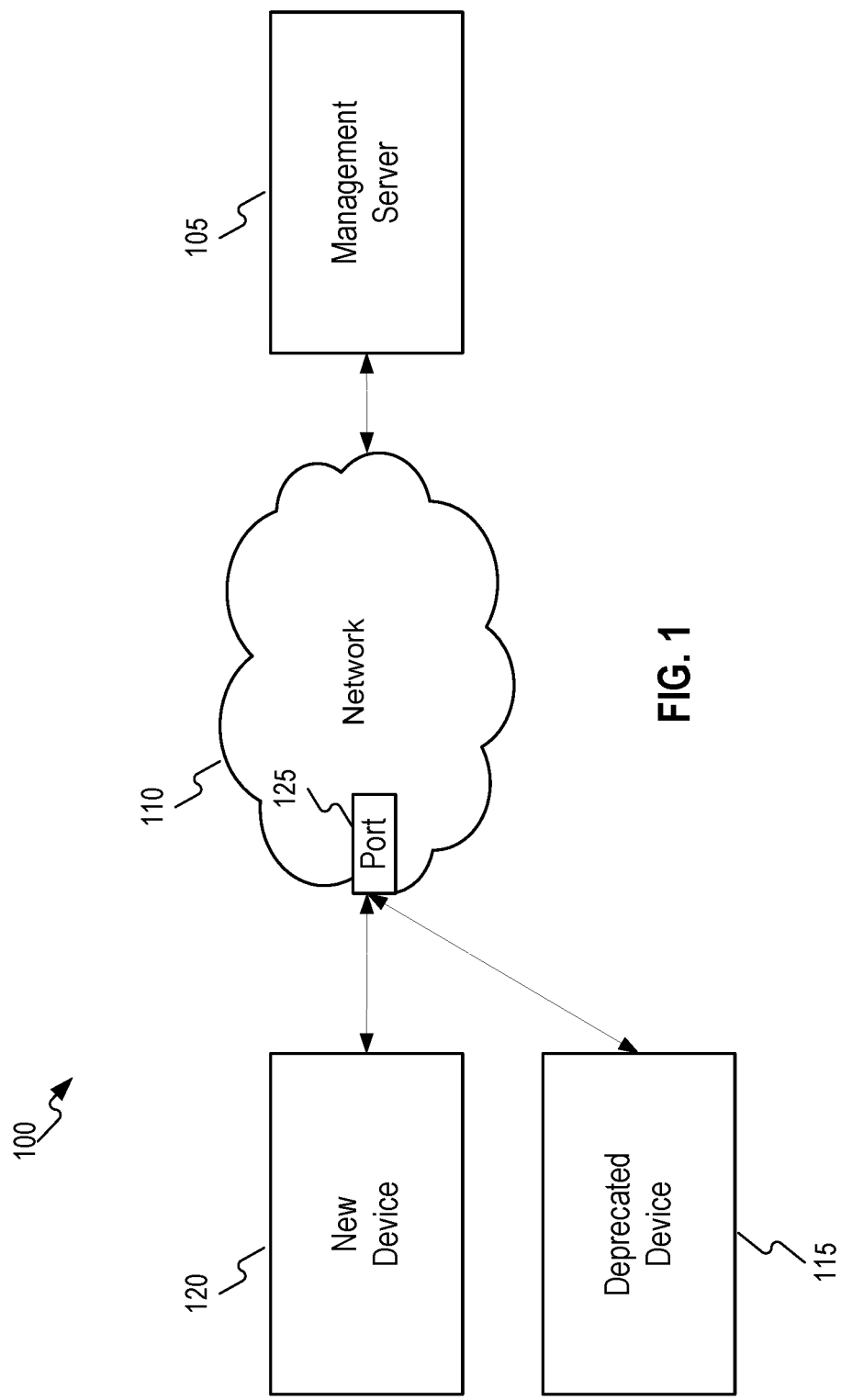
FIG. 1 is a block diagram of an operating environment for providing replacement of collaboration endpoints.

Replacement of collaboration endpoints may be provided. First, a management server may cause a deprecated device to display an upgrade function notification. An indication from the deprecated device that the upgrade function notification has been selected may be received. In response to receiving the indication from the deprecated device that the upgrade function notification has been selected, the deprecated device may be caused to display a password and instructions to replace the deprecated device with a new device. Next, the password and an address associated with the new device may be received from the new device. In response to receiving the password, the new device may then be provisioned using the address.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Collaboration endpoints may exist on networks. As technology advances, these endpoints may approach their useful life and, at some point, become deprecated. Network administrators may have to go through a process to replace these deprecated endpoints with new endpoints while retaining user-specific device configuration. For example, with conventional processes, network administrators may have to replace deprecated endpoints via a management server User Interface (UI). A network administrator, for example, may log into management server UI and obtain a list of deprecated endpoints based on a deprecated model. The network administrator may then delete these listed deprecated endpoints via the UI and provision replacement endpoints including mapping addresses (e.g., Media Access Control (MAC) addresses) of endpoints against user IDs. Then the network administrator may ship specific new endpoints (i.e., with the correct address mapping) to users, who connect the new endpoints to network ports. The new endpoints then register.

With other conventional processes, endpoints may be replaced via self-service login. For example, the network administrator may ship new endpoints to users with no mapping of addresses to users. The user may disconnect the old endpoint and connect the new endpoint to a network port. The user may then presses a soft key on the endpoint to initiate login and provides credentials. The credentials may be specific to the user or a common code generated by the network administrator. The new endpoint may become registered in the user's name, along with default settings for the user. Other settings from the old endpoint may be applied to new phones by the network administrator. The network administrator may also delete old endpoints from the management server using a UI or a bulk update tool.

These conventional processes are cumbersome in both of these cases, especially when a large number of endpoint have to be replaced after an upgrade. Embodiments of the disclosure may provide a process to provide, for example, replacement of deprecated endpoints with minimal administrative burden, making the endpoint refresh process smooth for users.

FIG. 1 shows an operating environment 100 for providing replacement of collaboration endpoints. As shown in FIG. 1, operating environment 100 may comprise a management server 105, a network 110, and collaboration endpoints (e.g., a deprecated device 115 and a new device 120). As will be described in greater detail below, deprecated device 115 or new device 120 may be connected to network 110 via a port 125 (e.g., a Local Area Network (LAN) port).

Operating environment 100 may provide Voice over Internet Protocol (VoIP) (i.e., Internet Protocol (IP) telephony) for the delivery of voice communications and multimedia sessions over IP networks, such as the Internet. The process for originating VoIP telephone calls may be similar to traditional digital telephony and may involve signaling, channel setup, digitization of the analog voice signals, and encoding. With VoIP, instead of being transmitted over a circuit-switched network, the digital information may packetized and transmission may occur as IP packets over a packet-switched network. The transport media streams for VoIP may use special media delivery protocols that encode audio and video with audio codecs and video codecs. Various codecs exist that may optimize the transport media streams based on application requirements and network bandwidth. Some implementations may rely on narrowband and compressed speech, while others may support high-fidelity stereo codecs for example.

Session Initiation Protocol (SIP) may be used, for example, by operating environment 100 to implement VoIP. SIP may comprise a signaling protocol used for initiating, maintaining, and terminating real-time sessions that include voice, video, and messaging applications for example. SIP may be used for signaling and controlling multimedia communication sessions in applications of Internet telephony for voice and video calls, in private IP telephone systems, in instant messaging over IP networks as well as mobile phone calling over Long Term Evolution (LTE) (VoLTE).

SIP may define a specific format of messages exchanged and a sequence of communications for cooperation of the participants. SIP may comprise a text-based protocol that may incorporate many elements of the Hypertext Transfer Protocol (HTTP) and the Simple Mail Transfer Protocol (SMTP). A call established with SIP may comprise multiple media streams, but no separate streams may be required for applications, such as text messaging, that exchange data as a payload in the SIP message. SIP may be used for creating, modifying, and terminating two-party (unicast) or multi-party (multicast) sessions. Sessions may consist of one or several media streams. Other SIP applications may include video conferencing, streaming multimedia distribution, instant messaging, presence information, file transfer, and online games. SIP protocol is an Application Layer protocol designed to be independent of the underlying Transport Layer; it can run on Transmission Control Protocol (TCP), User Datagram Protocol (UDP), or Stream Control Transmission Protocol (SCTP). SIP is a text-based protocol, incorporating many elements of the Hypertext Transfer Protocol (HTTP) and the Simple Mail Transfer Protocol (SMTP). Embodiments of the disclosure are not limited to SIP and may use other protocols such as Skinny Client Control Protocol (SCCP) for example.

Management server 105 may extend enterprise telephony features and functions to packet telephony network devices for example. These packet telephony network devices include, for example, IP telephones, media-processing devices, VoIP gateways, and multimedia applications. Additional data, voice, and video services, such as converged messaging, multimedia conferencing, collaborative contact centers, and interactive multimedia response systems, may interact with the IP telephony solution through management server 105 via an Application Programming Interface (API).

For example, management server 105 may provide to endpoints in operating environment 100 call processing, signaling and device control, dial plan administration, phone feature administration, directory services, programming interface to external applications, and backup and restore tools.

Deprecated device 115 and new device 120 may comprise, but are not limited to, collaboration endpoints. Deprecated device 115 or new device 120 may comprise, for example, a smart phone, a personal computer, a tablet device, a mobile device, a cable modem, a cellular base station, a telephone, a remote control device, a set-top box, a digital video recorder, an Internet-of-Things (IoT) device, a network computer, a mainframe, a router, or other similar microcomputer-based device. Deprecated device 115 or new device 120 may comprise a VoIP phone or an IP device that uses VoIP technologies for placing and transmitting telephone calls over an IP network, such as the Internet, instead of a traditional Public Switched Telephone Network (PSTN).

The elements described above of operating environment 100 (e.g., management server 105, deprecated device 115, and new device 120) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2:
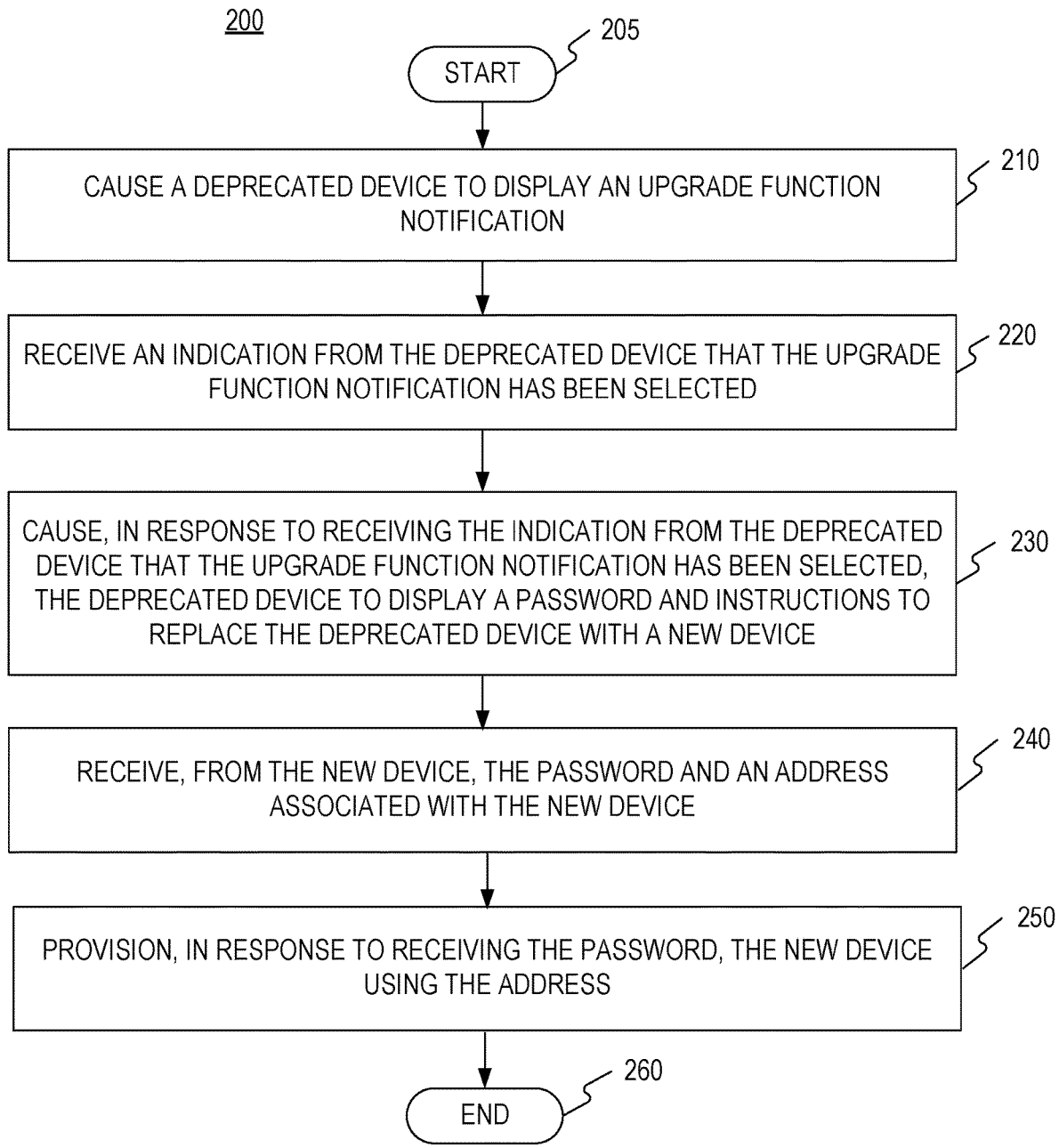
FIG. 2 is a flow chart of a method for providing replacement of collaboration endpoints.

FIG. 2 is a flow chart setting forth the general stages involved in a method 200 consistent with embodiments of the disclosure for providing replacement of collaboration endpoints. Method 200 may be implemented using management server 105 as described in more detail above with respect to FIG. 1. Ways to implement the stages of method 200 will be described in greater detail below.

Method 200 may begin at starting block 205 and proceed to stage 210 where management server 105 may cause deprecated device 115 to display an upgrade function notification. For example, when software in management server 105 is upgraded, an endpoint migration code added to the new software version may have a list of deprecated endpoint model numbers. When executed, this new software version may walk through a list of provisioned devices and generate a list of devices that may be mapped to the deprecated endpoint model numbers. The generated list of devices may be presented to an administrator for review and refinement. This new software version, for example, may be applied as a patch on a pre-upgrade management server software version to run a pre-upgrade check if the list has to be obtained before upgrade. The network administrator may ship new devices (e.g., new device 120) to users. This may be done prior to management server 105 software upgrade as well if the list is available before the software upgrade.

Consequently, management server 105 may push a special software or firmware version to deprecated devices (e.g., deprecated device 115), that may make them dysfunctional as telephony devices even though they may be allowed to make, for example, SIP registrations. At this point, an end user at deprecated device 115 may see an upgrade function notification caused to be displayed, for example, by management server 105 through the special software or firmware that was pushed to deprecated device 115. The upgrade function notification may be displayed, for example, on a user interface on deprecated device 115 or as an upgrade soft key on deprecated device 115 along with instructions on upgrading.

From stage 210, where management server 105 caused deprecated device 115 to display the upgrade function notification, method 200 may advance to stage 220 where management server 105 may receive an indication from deprecated device 115 that the upgrade function notification has been selected. For example, an end user at deprecated device 115 may select the upgrade function notification on a user interface of deprecated device 115 or the end user may press the upgrade soft key on deprecated device 115. Accordingly, deprecated device 115 may transmit and management server 105 may receive the indication that the upgrade function notification has been selected.

Once management server 105 received the indication from deprecated device 115 that the upgrade function notification has been selected in stage 220, method 200 may continue to stage 230 where management server 105 may cause, in response to receiving the indication from deprecated device 115 that the upgrade function notification has been selected, deprecated device 115 to display a password and instructions to replace deprecated device 115 with new device 120. For example, deprecated device 115 may send an upgrade request to management server 105 when the upgrade function notification is selected. This may be accomplished, for example, over an HTTP API or a SIP message (e.g., notify). In response, management server 105 may generate the password (e.g., a one-time password (OTP)) and add deprecated device 115's address (e.g., MAC address) and the password into a migration table. Management server 105 may then send the password to deprecated device 115 using, for example, an HTTP API or a SIP message. Deprecated device 115 may display the password along with instructions to connect new device 120. The end user may take note of the password and may disconnect deprecated device 115 from port 125.

After management server 105 caused, in response to receiving the indication from deprecated device 115 that the upgrade function notification has been selected, deprecated device 115 to display the password and the instructions to replace deprecated device 115 with new device 120 in stage 230, method 200 may proceed to stage 240 where management server 105 may receive, from new device 120, the password and an address associated with new device 120. For example, with deprecated device 115 now disconnected, the end user may connect new device 120 to port 125 (e.g., from where deprecated device 115 was disconnected). After being connected, new device 120 may present an option to the end user to enter the password. The end user may enter the password into new device 120 and new device 120 may send the password along with its own address (e.g., MAC address) and model number to management server 105 over, for example, a Representational State Transfer (REST) API (e.g., over HTTPS, secured using manufacturer-installed certificate on the new phone).

From stage 240, where management server 105 received, from new device 120, the password and the address associated with new device 120, method 200 may advance to stage 250 where management server 105 may provision, in response to receiving the password, new device 120 using the address. For example, management server 105 may use the password to index into a migration table of deprecated devices. If a matching entry is found in the migration table, management server 105 may run migration logic for transforming the configuration from the old model to the new model, based on the new model number received, carrying over applicable values, discarding values that are not applicable and applying reasonable defaults for new fields. After this migration, new device 120 may be provisioned.

Management server 105 may then send a success status response code (e.g., a 200 response code) to the REST API call. New device 120 may restart when it receives the success status response code and it may register against the new provisioning once it comes up after starting. The user and device settings (speed dial, soft key template, etc.) that were available on deprecated device 115 may now be available on new device 120. Deprecated device 115 may now be shipped back to the network administrator. No further configuration may be needed on management server 105.

The user experience for the network administrator may involve reviewing the list of deprecated phones if the network administrator chooses to, and to ship new devices to respective users. The experience for the end user may be, for example, to press an upgrade soft key on deprecated device 115, note the password, disconnect deprecated device 115 from port 125, connect new device 120 to port 125, and enter the password. Once management server 105 provisions, in response to receiving the password, new device 120 using the address in stage 250, method 200 may then end at stage 260.

Figure 3:
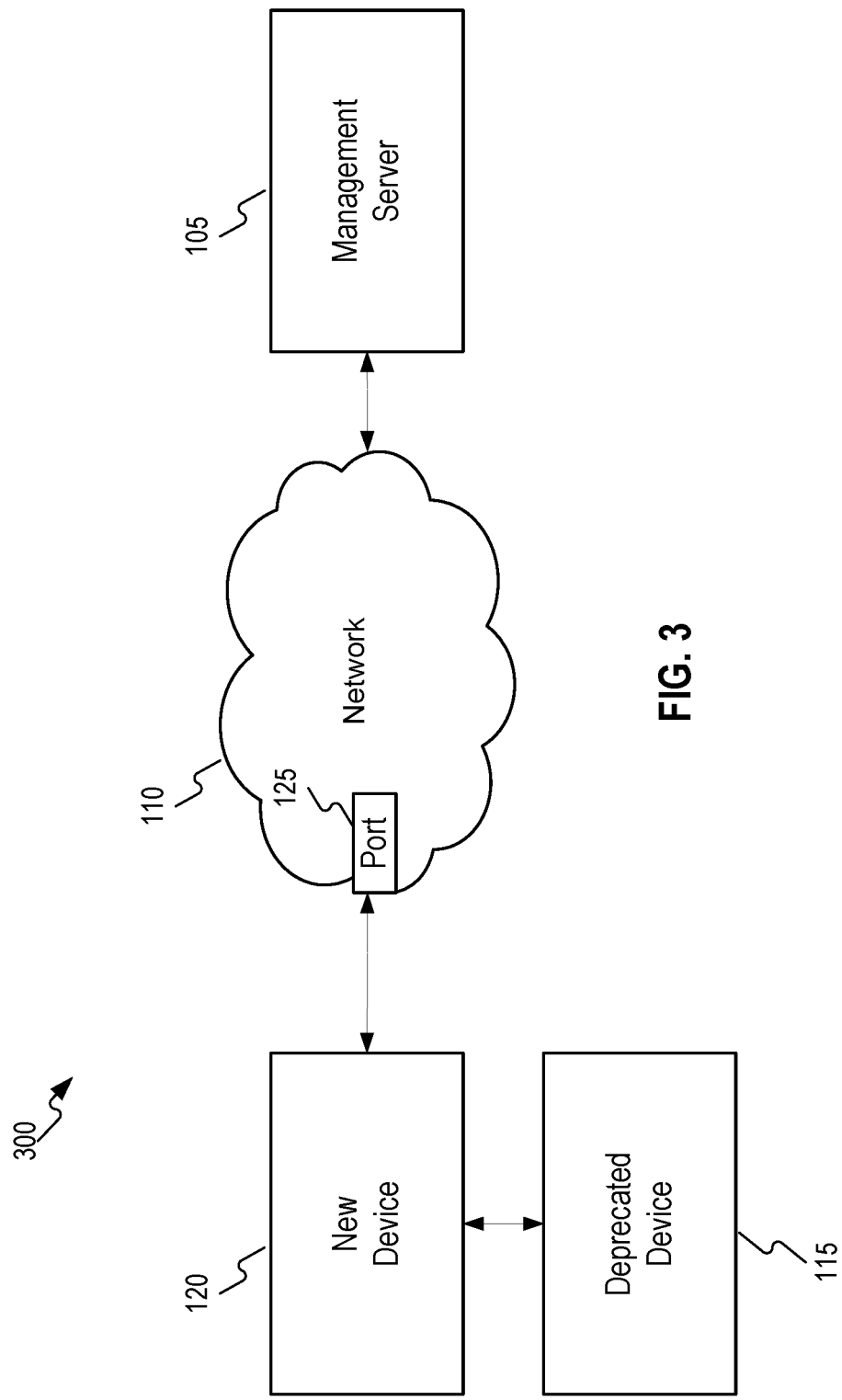
FIG. 3 is a block diagram of an operating environment for providing replacement of collaboration endpoints.

FIG. 3 shows an operating environment 300 for providing replacement of collaboration endpoints. Similar to operating environment 100 of FIG. 1, as shown in FIG. 3, operating environment 300 may comprise management server 105, network 110, and collaboration endpoints (e.g., deprecated device 115 and new device 120). As will be described in greater detail below, deprecated device 115 may connect to and may receive power from new device 120 while new device 120 is connected to network 110 via port 125.

Figure 4:
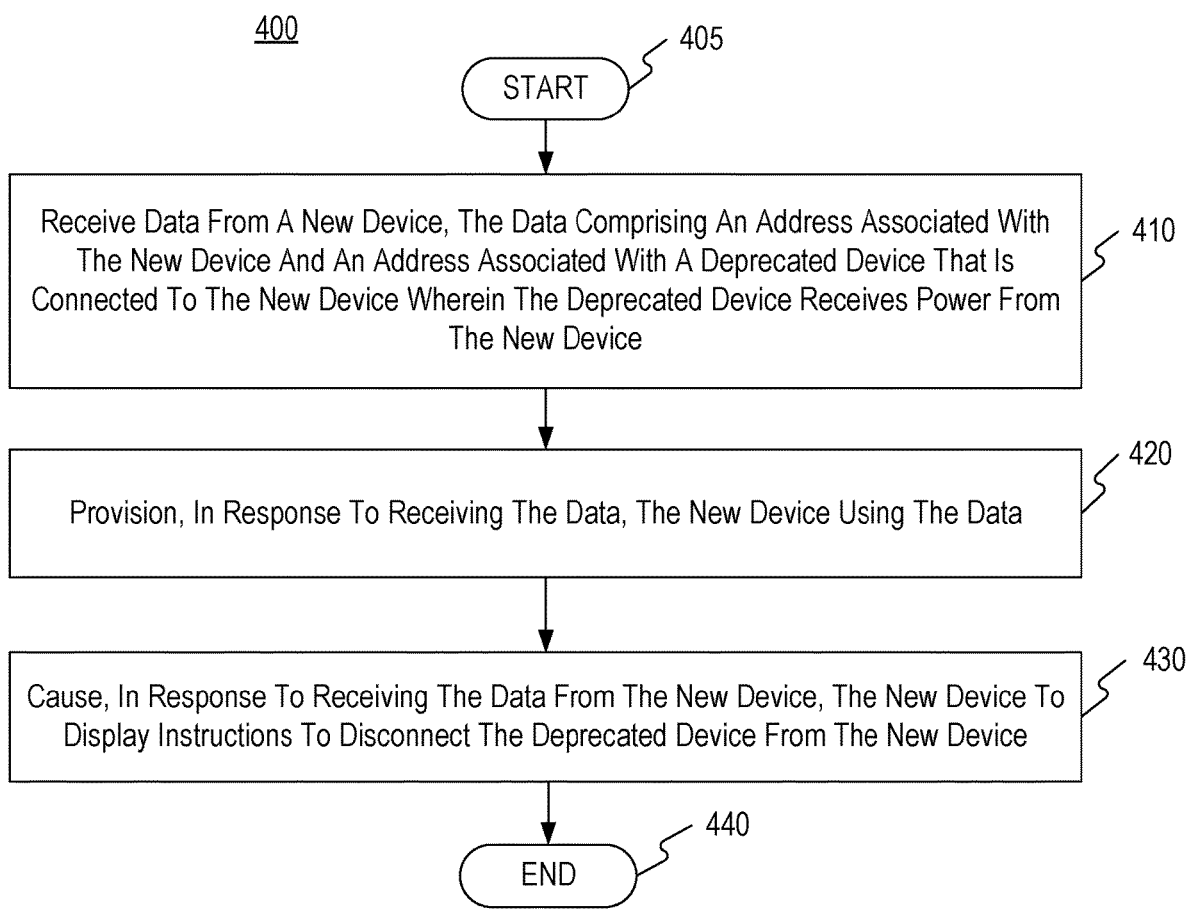
FIG. 4 is a flow chart of a method for providing replacement of collaboration endpoints.

FIG. 4 is a flow chart setting forth the general stages involved in a method 400 consistent with embodiments of the disclosure for providing replacement of collaboration endpoints. Method 400 may be implemented using management server 105 as described in more detail above with respect to FIG. 3. Ways to implement the stages of method 400 will be described in greater detail below.

Method 400 may begin at starting block 405 and proceed to stage 410 where management server 105 may receive data from new device 120. The data may comprise an address associated with new device 120 and an address associated with deprecated device 115 that is connected to new device 120. The data may further comprises a model number associated with new device 120. Deprecated device 115 may receive power from new device 120. For example, when software in management server 105 is upgraded, an endpoint migration code added to the new software version may have a list of deprecated endpoint model numbers. This new software version may walk through a list of provisioned devices and generate a list of devices that may be mapped to the deprecated model numbers. The generated devices list may be presented to an administrator for review and refinement. This software, for example, may be applied as a patch on a pre-upgrade management server software version to run a pre-upgrade check if the list has to be obtained before upgrade. The administrator may ship new devices (e.g., new device 120) to users. This may be done prior to management server 105 software upgrade as well, if the list is available before the upgrade.

From stage 410, where management server 105 receives the data from new device 120, method 400 may advance to stage 420 where management server 105 may provision, in response to receiving the data, new device 120 using the data. For example, the end user may disconnect deprecated device 115 from port 125 and connect new device 120 to port 125. At this point, new device 120 may receive a default number (e.g., not related to the user) if auto registration is enabled, otherwise, it may not register.

The end user may connect deprecated device 115 to new device 120 as shown in FIG. 3. The port on new device 120 to which deprecated device 115 is connected may comprise a port that provides power to deprecated device 115. For example, the port on the new device 120 to which deprecated device 115 is connected may comprise Power over Ethernet (PoE) port. Once connected, deprecated device 115 may perform a discovery protocol broadcast (e.g., a Layer 2 (L2) discovery protocol broadcast) with its own address (e.g., MAC address). New device 120 may detect the address of deprecated device 115 and, in response, may move to a "migration" mode. While in the migration mode, new device 120 may picks up its own address (e.g., MAC address) and model number and may call a REST API (e.g., over HTTPS, secured using manufacturer-installed certificate on the new phone) on management server 105 with deprecated device 115's address, new device 120's address, and new device 120's model number.

For example, management server 105 may use the password to index into a migration table of deprecated devices. If a matching entry is found in the migration table, management server 105 may run migration logic for transforming the configuration from the old model to the new model, based on the new model number received, carrying over applicable values, discarding values that are not applicable, and applying reasonable defaults for new fields. After this migration, new device 120 may be provisioned.

Management server 105 may then send a success status response code (e.g., a 200 response code) to the REST API call. New device 120 may restart when it receives the success status response code and it may register against the new provisioning once it comes up after starting. The user and device settings (speed dial, soft key template etc.) that were available on deprecated device 115 may now be available on new device 120.

Once management server 105 provisions, in response to receiving the data, new device 120 using the data in stage 420, method 400 may continue to stage 430 where management server 105 may cause, in response to receiving the data from new device 120, new device 120 to display instructions to disconnect deprecated device 115 from new device 120. For example, deprecated device 115 may now be shipped back to the network administrator. No further configuration may be needed on management server 105.

The user experience for the network administrator may involve reviewing a list of deprecated devices if the network administrator choose to, and to ship new devices to respective users. The experience for the end user may be to connect new device 120 to port 125, then connect deprecated device 115 to new device 120, and then to disconnect deprecated device 115 from new device 120 when migration is complete. Once management server 105 causes, in response to receiving the data from new device 120, new device 120 to display instructions to disconnect deprecated device 115 from new device 120 in stage 430, method 400 may then end at stage 440.

Figure 5:
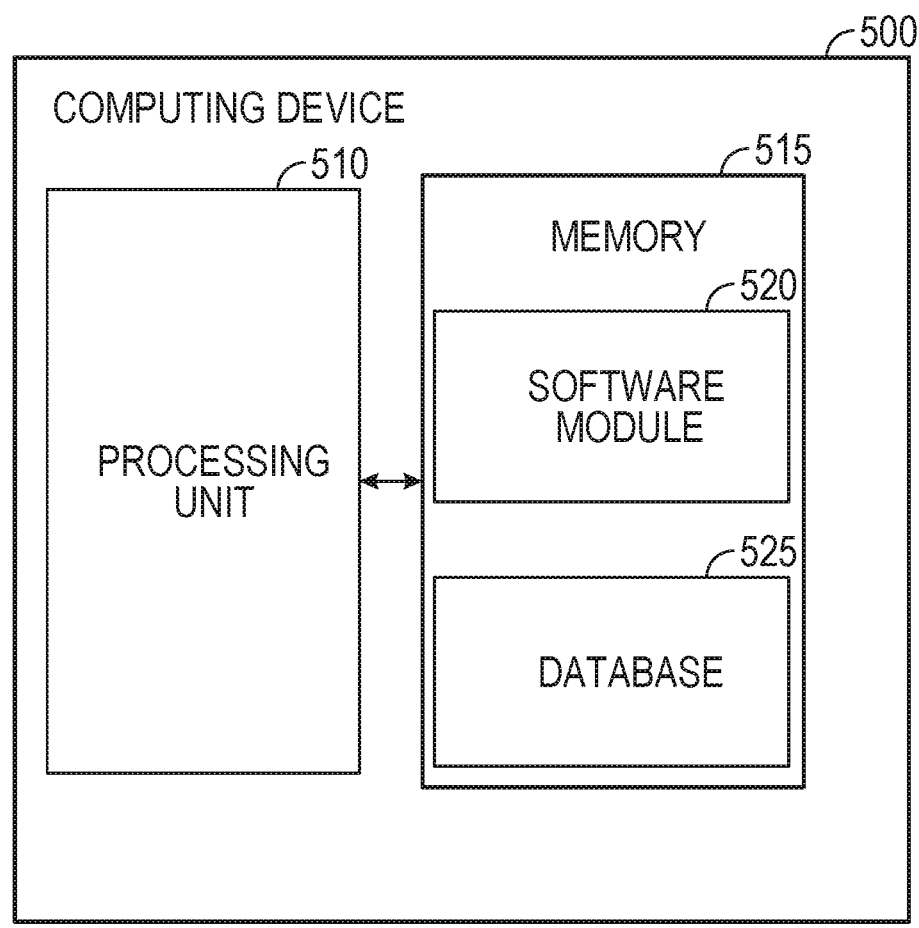
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing replacement of collaboration endpoints as described above with respect to FIG. 2 and FIG. 4. Computing device 500, for example, may provide an operating environment for management server 105, deprecated device 115, or new device 120. Management server 105, deprecated device 115, and new device 120 may operate in other environments and are not limited to computing device 500.

Computing device 500 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure may comprise a method. The method may comprise causing, by a management server, a deprecated device to display an upgrade function notification; receiving an indication from the deprecated device that the upgrade function notification has been selected; causing, in response to receiving the indication from the deprecated device that the upgrade function notification has been selected, the deprecated device to display a password and instructions to replace the deprecated device with a new device; receiving, from the new device, the password and an address associated with the new device; and provisioning, in response to receiving the password, the new device using the address. The deprecated device may comprise a Voice Over Internet Protocol (VoIP) device and the new device may comprise a VoIP device. Causing the deprecated device to display the upgrade function notification may comprise causing the deprecated device to display an upgrade soft key. Causing the deprecated device to display the upgrade function notification may further comprise causing the deprecated device to no longer function as a telephony device. Receiving the indication from the deprecated device that the upgrade function notification has been selected may comprise receiving the indication in response to a user selecting the upgrade function notification on the deprecated device. Receiving the password and the address associated with the new device may comprise receiving the password and the address associated with the new device from the new device connected to a port on a network where the deprecated device was previously connected.

Embodiments of the disclosure may comprise a method. The method may comprise receiving, by a management server, data from a new device, the data comprising an address associated with the new device and an address associated with a deprecated device that is connected to the new device wherein the deprecated device receives power from the new device; and provisioning, in response to receiving the data, the new device using the data. Receiving the data may further comprise receiving the data wherein the data further comprises a model number associated with the new device. Receiving the data from the new device may comprise receiving the data from the new device connected to a port on a network where the deprecated device was previously connected. Receiving the data from the new device may comprise receiving the data from the new device in response to the deprecated device transmitting the address associated with the deprecated device in response to the deprecated device being connected to the new device. The method may further comprise causing, in response to receiving the data from the new device, the new device to display instructions to disconnect the deprecated device from the new device. The deprecated device may comprise a Voice Over Internet Protocol (VoIP) device and the new device may comprise a VoIP device.

Embodiments of the disclosure may comprise a system. The system may comprise a memory storage and a processing unit coupled to the memory storage. The processing unit may be operative to: cause a deprecated device to display an upgrade function notification, receive an indication from the deprecated device that the upgrade function notification has been selected, cause, in response to receiving the indication from the deprecated device that the upgrade function notification has been selected, the deprecated device to display a password and instructions to replace the deprecated device with a new device, receive, from the new device, the password and an address associated with the new device, and provision, in response to receiving the password, the new device using the address. The deprecated device may comprise a Voice Over Internet Protocol (VoIP) device and the new device may comprise a VoIP device. The processing unit being operative to cause the deprecated device to display the upgrade function notification comprises the processing unit being operative to cause the deprecated device to display an upgrade soft key. The processing unit being operative to cause the deprecated device to display the upgrade function notification further comprises the processing unit being operative to cause the deprecated device to no longer function as a telephony device. The processing unit being operative to receive the password and the address associated with the new device comprises the processing unit being operative to receive the password and the address associated with the new device from the new device connected to a port on a network where the deprecated device was previously connected.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1A and FIG. 1B may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving, by a management server, data from a new device, the data comprising an address associated with the new device and an address associated with a deprecated device that is connected to the new device wherein the deprecated device receives power from the new device, wherein receiving the data from the new device comprises receiving the data from the new device in response to the deprecated device transmitting the address associated with the deprecated device in response to the deprecated device being connected to the new device;
provisioning, in response to receiving the data, the new device using the data; and
causing, in response to receiving the data from the new device, the new device to display instructions to disconnect the deprecated device from the new device.

2. The method of claim 1, wherein receiving the data further comprises receiving the data wherein the data further comprises a model number associated with the new device.

3. The method of claim 1, wherein receiving the data from the new device comprises receiving the data from the new device connected to a port on a network where the deprecated device was previously connected.

4. The method of claim 1, wherein the deprecated device comprises a Voice Over Internet Protocol (VoIP) device.

5. The method of claim 1, wherein the new device comprises a VoIP device.

6. A system comprising:
a memory storage; and
a processor coupled to the memory storage, wherein the processor is operative to:
receive data from a new device, the data comprising an address associated with the new device and an address associated with a deprecated device that is connected to the new device wherein the deprecated device receives power from the new device, wherein the processor being operative to receive the data from the new device comprises the processor being operative to receive the data from the new device in response to the deprecated device transmitting the address associated with the deprecated device in response to the deprecated device being connected to the new device;
provision, in response to receiving the data, the new device using the data; and
cause, in response to receiving the data from the new device, the new device to display instructions to disconnect the deprecated device from the new device.

7. The system of claim 6, wherein the processor being operative to receive the data further comprises the processor being operative to receive the data wherein the data further comprises a model number associated with the new device.

8. The system of claim 6, wherein the processor being operative to receive the data from the new device comprises the processor being operative to receive the data from the new device connected to a port on a network where the deprecated device was previously connected.

9. The system of claim 6, wherein the deprecated device comprises a Voice Over Internet Protocol (VoIP) device.

10. The system of claim 6, wherein the new device comprises a VoIP device.

11. A non-transitory computer-readable medium that stores a set of instructions which when executed perform a method comprising:
receiving, by a management server, data from a new device, the data comprising an address associated with the new device and an address associated with a deprecated device that is connected to the new device wherein the deprecated device receives power from the new device, wherein receiving the data from the new device comprises receiving the data from the new device in response to the deprecated device transmitting the address associated with the deprecated device in response to the deprecated device being connected to the new device; and
provisioning, in response to receiving the data, the new device using the data; and
causing, in response to receiving the data from the new device, the new device to display instructions to disconnect the deprecated device from the new device.

12. The non-transitory computer-readable medium of claim 11, wherein receiving the data further comprises receiving the data wherein the data further comprises a model number associated with the new device.

13. The non-transitory computer-readable medium of claim 11, wherein receiving the data from the new device comprises receiving the data from the new device connected to a port on a network where the deprecated device was previously connected.

14. The non-transitory computer-readable medium of claim 11, wherein the deprecated device comprises a Voice Over Internet Protocol (VoIP) device.

15. The non-transitory computer-readable medium of claim 11, wherein the new device comprises a VoIP device.

* * * * *